United States Patent [19]
Brudette et al.

[11] 3,739,626
[45] June 19, 1973

[54] METHOD FOR MEASURING LIQUID PROPELLANT STABILITY

[75] Inventors: George W. Brudette; Dean H. Couch, both of China Lake, Calif.

[73] Assignee: The United States of America as represented by the Secretary of the Navy, Washington, D.C.

[22] Filed: Sept. 22, 1971

[21] Appl. No.: 182,607

[52] U.S. Cl............................ 73/16, 73/149, 73/32
[51] Int. Cl.............................................. G01f 17/00
[58] Field of Search ............... 73/15, 16, 149, 410, 73/425.6; 92/91

[56] References Cited
UNITED STATES PATENTS

| | | | |
|---|---|---|---|
| 3,662,928 | 5/1972 | Pogorski et al. | 73/425.6 |
| 3,182,497 | 5/1965 | Rubens et al. | 73/16 |
| 2,838,071 | 6/1958 | Wood | 73/410 |
| 3,411,351 | 11/1968 | Schwartz | 73/149 |
| 2,718,904 | 9/1955 | Poyle | 73/410 |
| 3,624,828 | 11/1971 | Edwards | 73/149 |

*Primary Examiner*—Herbert Goldstein
*Attorney*—R. S. Sciascia, Roy Miller and Lloyd E. K. Pohl

[57] ABSTRACT

Metal, weld-sealed apparatus for use in studying the stability of liquid rocket propellants is disclosed. Pressure data on liquid propellants are obtained by placing a known volume of propellant in apparatus of known volume, bringing the apparatus and its contents to thermal equilibrium at a predetermined temperature and measuring the volume change of the apparatus.

1 Claim, 5 Drawing Figures

METHOD FOR MEASURING LIQUID PROPELLANT STABILITY

BACKGROUND OF THE INVENTION

1. Field of the Invention

This invention relates to apparatus and a method for studying the stability of liquid rocket propellants over a wide range of temperatures.

2. Description of the Prior Art.

In the prior art, closed containers containing a known volume of liquid propellant and connected to either a mercury manometer or a Bourden tube pressure gage have been used to study the pressure phenomena of liquid propellants at various temperatures. If a mercury manometer is used, the propellant is exposed as a liquid and as a vapor (if a vapor phase exists) to mercury. If a Bourdon tube is used the propellant is exposed to the metal of the tube which is usually different from that of the container. In either case, a question as to the purity of the propellant during and after the test as opposed to before the test always exists. To combat this problem, various isolating fluids are often used to separate the propellant from the measuring device but the effect of these fluids on the propellant is uncertain and the propellant may diffuse through the isolating media.

A problem encountered with Bourdon tube gages attached to the closed container by means of threads is that of propellant leakage. It is extremely difficult to reliably seal threads, especially to hydrogen, and the use of thread sealants introduces unknowns. This sealing problem can be solved by using a metal bellows or wafer which is welded in place between the gage and the sample container. Likewise, the filling tube utilized to fill the sample container can be crimped and welded shut. This method gives a positively closed system with the added advantage of exposing the propellant to only the metal of the system. Another method for sealing all-in-one metal containers used in vacuum studies is to V-crimp a closure wafer into the container by means of a flange made of harder metal. This offers a less positive seal than the welded method but is more suitable for short term studies where small samples are required and where post-test sample inspection is desired. And, even when all metal, positively sealed containers are used, the pressure gages must be vacuum filled with a suitable high boiling fluid so that the gage will respond to the pressure developed in the container. Furthermore, the increase in volume of a Bourdon tube (2 to 3 percent) as the pressure rises must be considered since the bellows or wafer has to move this amount without appreciable pressure drop.

In view of the above problems, the need for a single laboratory device which can be used for studies of liquid propellant stability has been keenly felt.

SUMMARY OF THE INVENTION

A metal weld-sealed apparatus for studying the pressure phenomena produced by liquid propellants at various temperatures which does not require the use of a gage or manometer is described below. A method for calibrating and utilizing the apparatus is also described.

DESCRIPTION OF THE PREFERRED EMBODIMENT

Figure 1:
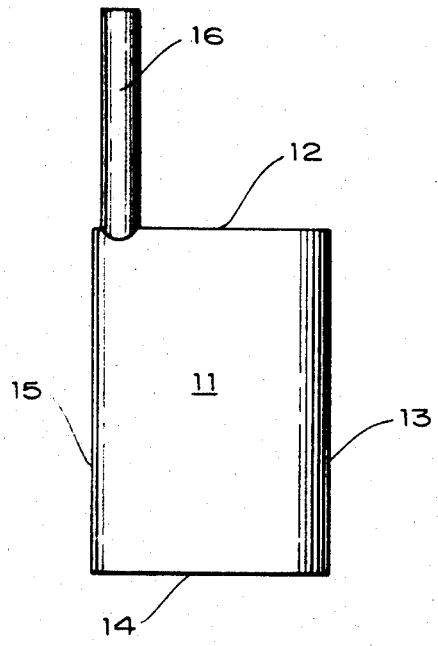
FIG. 1 is a side elevational view of apparatus according to this invention.

Going first to the drawing in which like portions of the apparatus are indicated in the several Figures by like numerals, FIG. 1 is a side elevational view of apparatus according to this invention. FIG. 1 depicts a cell 11 which can be loaded with liquid propellant through a fill tube 16. The apparatus is fabricated either by welding together two bowed out sheets of metal along edges 12, 13, 14 and 15, removing a portion of edge 12, and welding the tubular fill tube 16 into the opening thus created in edge 12 or by flattening a tube into a cell 11, welding the pressed together edges, cutting away a portion of an edge and attaching fill tube 16 by welding.

Figure 2:
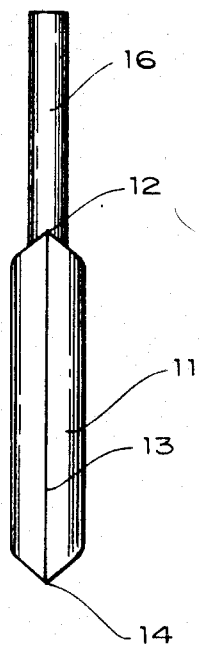
FIG. 2 is an end elevational view of the apparatus of FIG. 1.

FIG. 2 is an end view of the apparatus of FIG. 1 which more clearly depicts what is meant by the term "bowed out." It can be seen from this Figure that the cell 11 only comes together at its edges and thus forms a hollowed out body which is suitable for accepting liquid propellant.

Figure 3:
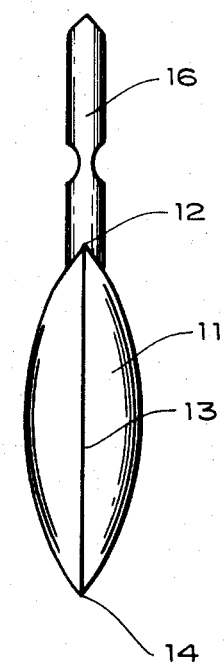
FIG. 3 is an end elevational view of the apparatus of FIGS. 1 and 2 after it has been loaded with a propellant sample, sealed and brought to equilibrium at an elevated temperature.

FIG. 3 is an end elevational view of the apparatus of FIGS. 1 and 2 showing how it appears after it has been loaded with a known amount of liquid propellant, sealed, placed in an oven at an elevated temperature and brought to equilibrium. It will be noted that the sides of the cell are deflected outwardly due to internal pressure from vaporized propellant.

In use, a cell of known volume is loaded with a propellant sample of known volume, the fill tube is safety crimped approximately midway between the cell and the end of the tube, the end of the fill tube is flushed with a suitable inert gas such as nitrogen or one of the noble gases, crimped and welded shut and the loaded apparatus is placed in an oven set at a desired temperature. After the apparatus and its contents have reached temperature equilibrium, an initial or zero-time reading is taken by measuring the outward deflection of the cell with a micrometer. Then, subsequent micrometer readings will reveal whether or not additional pressure development has occurred. If further pressure development has occurred, the value is obtained from a pressure calibration chart, an ullage correction is made, and a pressure/ullage/time-of-storage relationship is acquired.

To calibrate apparatus according to this invention and obtain a calibration chart, a plurality of cells of a given size and material are first prepared. Then, some of the cells of the lot are pressurized by an external means and wall deflection (cell expansion) at various known pressures is determined with a micrometer.

Since the walls of a cell must be deflected outwardly by pressure in order for apparatus of this invention to be useful, it is preferable that they be thin. In most cases it is also preferable that the fill tube and welds be of the same metal as the cell in order that the propellant only be subjected to or brought into contact with one metal.

EXAMPLE

Figure 4:
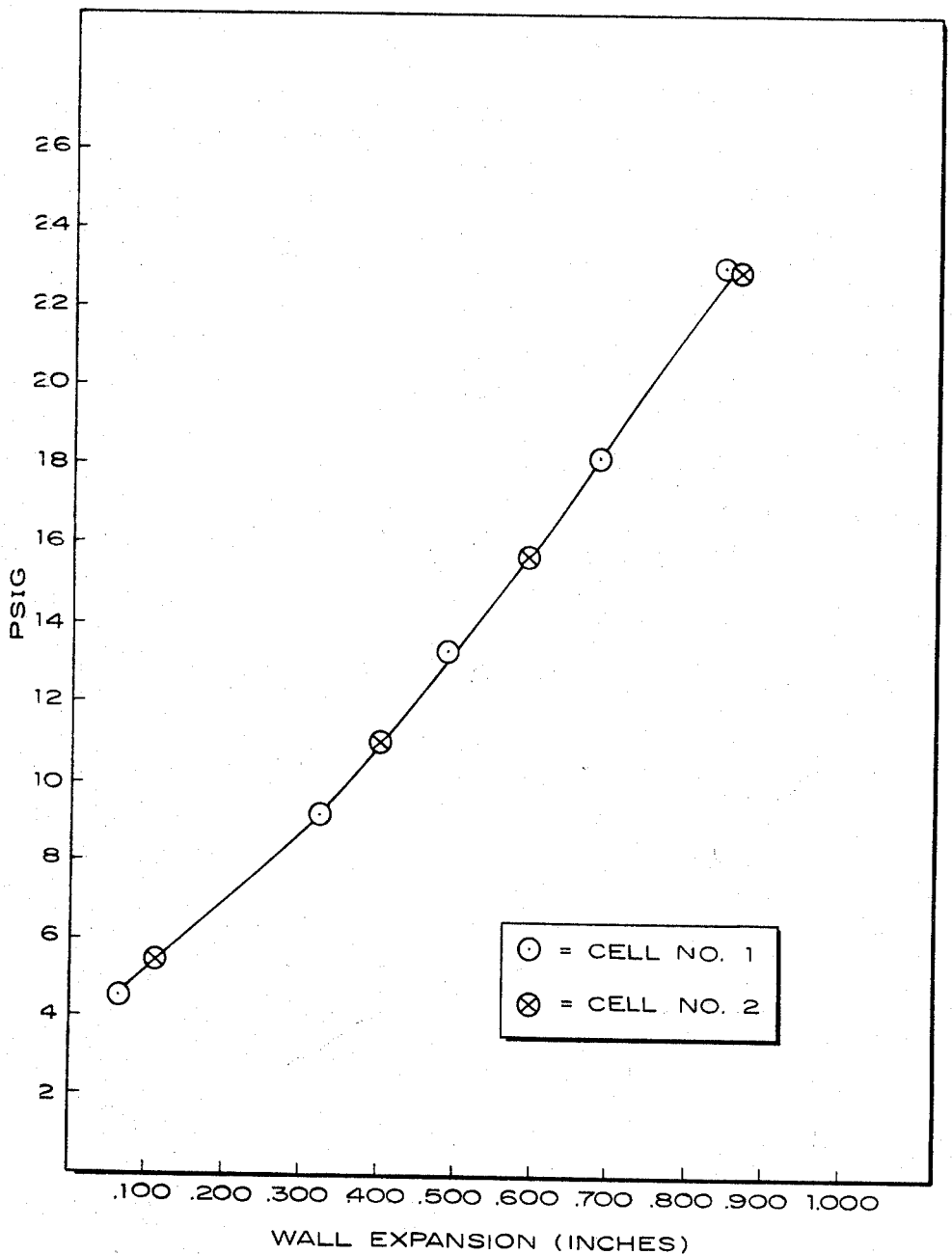
FIG. 4 is a typical calibration curve for apparatus according to this invention.
Figure 5:
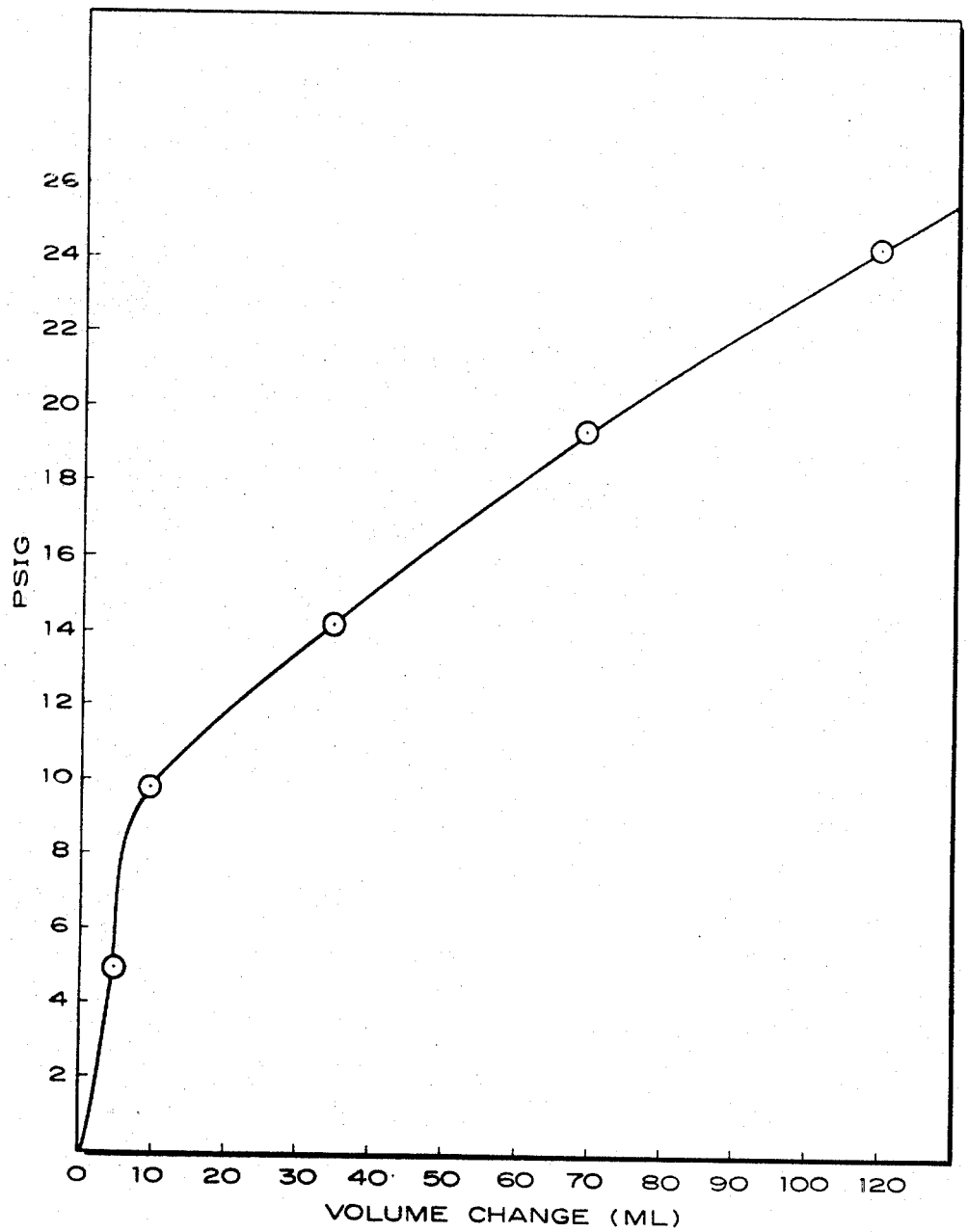
FIG. 5 is a typical ullage correction curve for apparatus according to this invention.

A plurality of cells were prepared from 0.030 inch thick aluminum tubing 2.5 inches in diameter by flattening several pieces of tubing to thickness of 0.5 inch and widths of 3.75 inches. The cell bodies were 5.0 inches long and aluminum fill tubes having three-eighth inch outside diameters were welded into place as shown in the drawing. When two of the cells were pressurized, outward deflection was linear running from a deflection of 0.1 inch at 6 psig to 0.9 inch at 25 psig for both cells. Thus, the linear calibration curve shown in FIG. 4 was obtained. After obtaining the calibration curve of FIG. 4 the ullage correction curve shown in FIG. 5 was obtained by measuring the volume change of a cell at a plurality of pressures. Once the calibration curve and the ullage correction curve were obtained, a series of tests were carried out by placing known volume samples of liquid rocket propellant in cells, sealing the cells as depicted in FIG. 3, bringing the cells and their contents to temperature equalibrium at various predetermined temperatures, measuring the outward deflection of the cell walls with a micrometer to obtain data and making the indicated determinations and corrections from the curves. The plurality of cells of this specific example produced test measurements equal to or superior to those obtained by prior art methods in which manometers or Bourdon tubes were used to obtain pressure data without any of the attendant difficulties.

While the above example is very specific in reciting wall thickness, size, etc. for a plurality of cells, it will be apparent that cells having walls of thicknesses other than that recited and having sizes other than that recited may be fabricated, calibrated and used in the same manner with equal facility. It will also be apparent that many other metals and alloys may be used in lieu of the aluminum recited.

An alternate method for measuring pressure development within the cell consists of immersing the cell completely in a non-compressible liquid which is contained in a non-expanding container to which is attached a pressure gage. The use of this method eliminates the need for ullage correction. Potential problems with this method would include cell test liquid/container liquid reaction if the cell should leak and difficulty of removing the cell from the holding container under conditions of high pressure.

What is claimed is:

1. A method for determining pressure changes associated with the storage of liquid propellants at a predetermined temperature, said method comprising the steps of:
   a. placing a known volume of liquid propellant in a hollow cell consisting of thin metallic walls which deflect outwardly when pressure resulting from the vaporization of said propellant develops within the interior of said cell and a filling tube of the same material as said cell leading into the interior of said cell;
   b. sealing said cell;
   c. bringing said cell and the sealed in propellant to temperature equilibrium at said predetermined temperature and retaining it at said temperature for a predetermined length of time;
   d. periodically measuring the outside dimensions of said cell; and
   e. comparing the measurements to a calibration chart obtained by pressurizing a plurality of like cells at a plurality of known pressures and measuring them.

* * * * *

UNITED STATES PATENT OFFICE
CERTIFICATE OF CORRECTION

Patent No. 3,739,626　　　　　　　　　　Dated June 19, 1973

Inventor(s) George W. Burdette and Dean H. Couch

It is certified that error appears in the above-identified patent and that said Letters Patent are hereby corrected as shown below:

Front page, Inid number [75], "Brudette" should read --Burdette--.

Signed and sealed this 19th day of February 1974.

(SEAL)
Attest:

EDWARD M. FLETCHER, JR.
Attesting Officer

C. MARSHALL DANN
Commissioner of Patents